(12) United States Patent
Kim

(10) Patent No.: US 11,073,982 B2
(45) Date of Patent: Jul. 27, 2021

(54) VEHICLE AND METHOD OF CONTROLLING THE SAME

(71) Applicants: Hyundai Motor Company, Seoul (KR); Kia Motors Corporation, Seoul (KR)

(72) Inventor: Youngbeom Kim, Bucheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/567,599

(22) Filed: Sep. 11, 2019

(65) Prior Publication Data

US 2020/0319790 A1 Oct. 8, 2020

(30) Foreign Application Priority Data

Apr. 2, 2019 (KR) .................. 10-2019-0038200

(51) Int. Cl.
*G06F 3/0488* (2013.01)
*G06F 3/01* (2006.01)
*G06F 3/041* (2006.01)

(52) U.S. Cl.
CPC .......... *G06F 3/04883* (2013.01); *G06F 3/014* (2013.01); *G06F 3/0414* (2013.01); *G06F 3/04166* (2019.05); *G06F 2203/04101* (2013.01); *G06F 2203/04104* (2013.01); *G06F 2203/04106* (2013.01)

(58) Field of Classification Search
None
See application file for complete search history.

(56) References Cited

U.S. PATENT DOCUMENTS

| 2011/0102464 | A1* | 5/2011 | Godavari | G06F 3/0416 |
| | | | | 345/650 |
| 2011/0167391 | A1* | 7/2011 | Momeyer | G06F 3/038 |
| | | | | 715/863 |
| 2014/0168061 | A1* | 6/2014 | Kim | G06F 3/017 |
| | | | | 345/156 |
| 2015/0054637 | A1* | 2/2015 | Kim | B60R 16/0232 |
| | | | | 340/438 |
| 2017/0120930 | A1* | 5/2017 | Ling | G06F 3/017 |

FOREIGN PATENT DOCUMENTS

KR 10-2014-0062895 A 5/2014

* cited by examiner

*Primary Examiner* — Aneeta Yodichkas
(74) *Attorney, Agent, or Firm* — Morgan, Lewis & Bockius LLP

(57) ABSTRACT

A vehicle includes: at least one output device; a motion recognition sensor configured to output a signal for a finger motion of a user; and a controller configured to: determine a finger motion pattern based on the signal for the finger motion; determine a first output device corresponding to the determined finger motion pattern among the at least one output device; determine an operation command corresponding to the determined finger motion pattern; and control the first output device based on the operation command.

28 Claims, 9 Drawing Sheets

FIG. 3

| OUTPUT DEVICE (150) / OPERATION CONTENTS | AIR CONDITIONER(151) | AVN DEVICE(152) | WINDOW OPENING /CLOSING DEVICE(153) |
|---|---|---|---|
| SELECT CONTROL TARGET | INDEX FINGER 2 TIMES | INDEX FINGER 1 TIME ⇑ THUMB 1 TIME | INDEX FINGER 1 TIME ⇑ MIDDLE FINGER 1 TIME |
| SELECT MODE | COOLING:<br>THUMB 1 TIME<br>⇑ INDEX FINGER 1 TIME<br>HEATING:<br>THUMB 2 TIMES<br>⇑ INDEX FINGER 1 TIME<br>BLOWING:<br>THUMB 3 TIMES<br>⇑ INDEX FINGER 1 TIME<br>AIR CLEAN:<br>THUMB 4 TIMES<br>⇑ INDEX FINGER 1 TIME | RADIO:<br>THUMB 1 TIME<br>⇑ INDEX FINGER 1 TIME<br>AUDIO:<br>THUMB 2 TIMES<br>⇑ INDEX FINGER 1 TIME<br>VIDEO:<br>THUMB 3 TIMES<br>⇑ INDEX FINGER 1 TIME<br>NAVIGATION:<br>THUMB 4 TIMES<br>⇑ INDEX FINGER 1 TIME | |
| OPERATION COMMAND | ON/OFF:<br>MIDDLE FINGER 2 TIMES<br>TEMPERATURE INCREASE:<br>INDEX FINGER 3 TIMES<br>TEMPERATURE DECREASE:<br>MIDDLE FINGER 3 TIMES<br>CHANGE WIND DIRECTION:<br>RING FINGER 3 TIMES<br>CHANGE WIND SPEED:<br>LITTLE FINGER 3 TIMES | ON/OFF:<br>MIDDLE FINGER 2 TIMES<br>VOLUME INCREASE:<br>INDEX FINGER 3 TIMES<br>VOLUME DECREASE:<br>MIDDLE FINGER 3 TIMES<br>CHANGE CHANNEL:<br>RING FINGER 3 TIMES<br>START / END DIRECTIONS:<br>LITTLE FINGER 3 TIMES | WINDOW OPENING:<br>INDEX FINGER 3 TIMES<br>WINDOW CLOSING:<br>MIDDLE FINGER 3 TIMES |

VEHICLE AND METHOD OF CONTROLLING THE SAME

CROSS-REFERENCE TO RELATED APPLICATION(S)

This application is based on and claims priority to Korean Patent Application No. 10-2019-0038200, filed on Apr. 2, 2019 in the Korean Intellectual Property Office, the disclosure of which is incorporated by reference in its entirety.

TECHNICAL FIELD

The present disclosure relates to a vehicle and a control method thereof for controlling an in-vehicle output device based on a finger motion of a user.

BACKGROUND

In general, a user can operate a switch provided at a specific position to control an in-vehicle output device. At this time, the user can gaze at the switch provided at the specific position, thereby increasing the risk of accident of a vehicle.

Accordingly, in recent years, 3D touch technology for controlling in-vehicle output devices has been actively studied, and technology for controlling output devices in a vehicle by sensing movement of a user by using a radar, a camera, and a wearable device has been developed.

However, the present 3D touch technology has a limitation in the operation range according to the limit of the recognition range through the radar or the camera, and there is a limit to detecting minuscule movements of the user.

SUMMARY

It is an aspect of the disclosure to provide a vehicle for determining a user's finger motion in a detailed pattern and control an in-vehicle output device based on the determined finger motion pattern.

In accordance with an aspect of the disclosure, a vehicle comprises: at least one output device; a motion recognition sensor configured to output a signal for a finger motion of a user; and a controller configured to: determine a finger motion pattern based on the signal for the finger motion; determine a first output device corresponding to the determined finger motion pattern among the at least one output device; determine an operation command corresponding to the determined finger motion pattern; and control the first output device based on the operation command.

The controller may determine at least one of a motion of each of a plurality of fingers or a sequence of motions between the plurality of fingers by comparing the signal for the finger motion and a reference value for each of the plurality of fingers; and determine the finger motion pattern based on at least one of the motion of each of the plurality of fingers or the sequence of motions between the plurality of fingers.

The controller may determine the first output device and the operation command based on information indicating a pre-stored correlation between the finger motion pattern and the operation of the output device.

The controller may determine the first output device based on a first finger motion pattern among the determined finger motion patterns; and determine the operation command for the first output device including at least one command for starting, ending, strength, or direction of an output based on a second finger motion pattern determined based on the finger motion of the user after the determination of the first finger motion pattern among the determined finger motion patterns.

The controller may determine an operation mode for the first output device including a command for a kind of output based on a third finger motion pattern determined based on the finger motion of the user after the determination of a first finger motion pattern and before the determination of a second finger motion pattern among the determined finger motion patterns.

The vehicle may further comprise an input device for receiving an input from the user.

The controller may determine the finger motion pattern based on the signal for the finger motion to control the first output device, when receiving an input from at least one of the input device or the motion recognition sensor, the input indicating an initiation of control for the at least one output device.

The controller may stop the operation of controlling the first output device, when receiving an input from at least one of the input device or the motion recognition sensor, the input indicating an end of control for the at least one output device.

The controller may receive a signal for a new finger motion from the motion recognition sensor when receiving an input for addition of a new finger motion pattern from at least one of the input device or the motion recognition sensor; and receive an input from the input device for a new operation command for any one of the at least one output device.

The controller may update information indicating a pre-stored correlation between the finger motion pattern and the operation of the output device so that the new finger motion pattern for the new finger motion and the new operation command for the any one of the at least one output device correspond to each other.

The output device may comprise at least one of an air conditioner, an audio, video, navigation (AVN) device, a window opening/closing device, a lamp control device, a wiper control device, or a driving assist system.

The controller may control the AVN device to output information on a first output device and the operation command at least one of visually or audibly.

The controller may control the first output device based on the operation command, when receiving an input from the at least one of the input device or the motion recognition sensor to approve the operation command for the first output device.

The controller may control the AVN device to output a message that induces an input for at least one finger motion.

The controller may receive the signal for the finger motion of the user inputted corresponding to the message from the motion recognition sensor; and update at least one reference value for each of the plurality of fingers used for determination of the finger motion pattern based on the received signal for the finger motion.

The motion recognition sensor is a piezoelectric element that outputs an electrical signal corresponding to the finger motion of the user, and the motion recognition sensor is attached to at least one of the user's hand, palm, wrist or arm, or is provided in at least one of a steering wheel or a gear rod of the vehicle.

In accordance with another aspect of the disclosure, a method of controlling a vehicle that comprises at least one output device and a motion recognition sensor configured to output a signal for a finger motion of a user, the method comprising: determining a finger motion pattern based on the signal for the finger motion; determining a first output device corresponding to the determined finger motion pattern among the at least one output device; determining an operation command corresponding to the determined finger motion pattern; and controlling the first output device based on the operation command.

The determining of the finger motion pattern may comprise: determining at least one of a motion of each of a plurality of fingers or a sequence of motions between the plurality of fingers by comparing the signal for the finger motion and a reference value for each of the plurality of fingers; and determining the finger motion pattern based on at least one of the motion of each of the plurality of fingers or the sequence of motions between the plurality of fingers.

The determining of the operation command may comprise: determining the first output device and the operation command based on information indicating a pre-stored correlation between the finger motion pattern and an operation of the output device.

The determining of the first output device may comprise: determining the first output device based on a first finger motion pattern among the determined finger motion patterns, and the determining of the operation command may comprise: determining the operation command for the first output device including at least one command for starting, ending, strength, or direction of an output based on a second finger motion pattern determined based on the finger motion of the user after the determination of the first finger motion pattern among the determined finger motion patterns.

The method may further comprise: determining an operation mode for the first output device including a command for a kind of output based on a third finger motion pattern determined based on the finger motion of the user after the determination of a first finger motion pattern and before the determination of a second finger motion pattern among the determined finger motion patterns.

The vehicle further comprises an input device for receiving an input from the user.

The method may further comprise: determining the finger motion pattern based on the signal for the finger motion to control the first output device, when receiving an input from at least one of the input device or the motion recognition sensor, the input indicating an initiation of control for the at least one output device.

The method may further comprise: stopping the operation of controlling the first output device, when receiving an input from at least one of the input device or the motion recognition sensor, the input indicating an end of control for the at least one output device.

The method may further comprise: receiving a signal for a new finger motion from the motion recognition sensor when receiving an input for addition of a new finger motion pattern from at least one of the input device or the motion recognition sensor; and receiving an input from the input device for a new operation command for any one of the at least one output device.

The method may further comprise: updating information indicating a pre-stored correlation between the finger motion pattern and the operation of the output device so that the new finger motion pattern for the new finger motion and the new operation command for the any one of the at least one output device correspond to each other.

The output device may comprise at least one of an air conditioner, an AVN device, a window opening/closing device, a lamp control device, a wiper control device, or a driving assist system.

The method may further comprise: controlling the AVN device to output information on a first output device and the operation command at least one of visually or audibly.

The method may further comprise: controlling the first output device based on the operation command, when receiving an input from the at least one of the input device or the motion recognition sensor to approve the operation command for the first output device.

The method may further comprise: controlling the AVN device to output a message that induces an input for at least one finger motion.

The method may further comprise: receiving the signal for the finger motion of the user inputted corresponding to the message from the motion recognition sensor; and updating at least one reference value for each of the plurality of fingers used for determination of the finger motion pattern based on the received signal for the finger motion.

The motion recognition sensor may be a piezoelectric element that outputs an electrical signal corresponding to the finger motion of the user, and the motion recognition sensor is attached to at least one of the user's hand, palm, wrist or arm, or is provided in at least one of a steering wheel or a gear rod of the vehicle.

According to one aspect of the disclosure, it is possible to more accurately recognize the movement of the user and to control the in-vehicle output device more safely and accurately without a separate switching operation requiring the user's gaze, by determining the finger motion of the user as a subdivided pattern and controlling the in-vehicle output device based on the determined finger motion pattern.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 3 is a view illustrating information indicating a correlation between a finger motion pattern and an operation of an output device according to an exemplary embodiment of the present disclosure;

DETAILED DESCRIPTION

Figure 1:
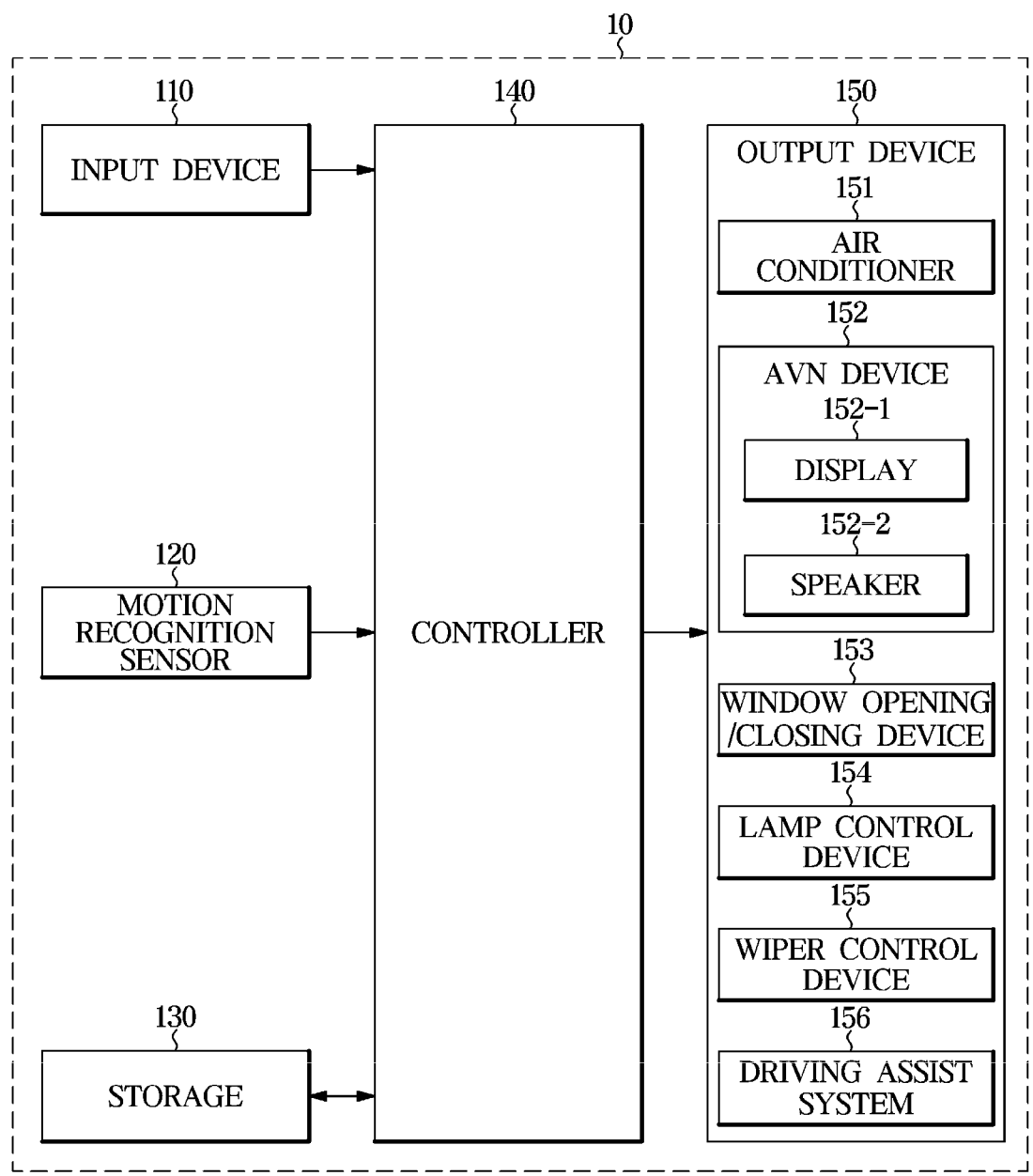
FIG. 1 is a control block diagram of a vehicle according to an exemplary embodiment of the present disclosure.

Like numbers refer to like elements throughout this specification. This specification does not describe all components of the embodiments, and general information in the technical field to which the disclosure belongs or overlapping information between the embodiments will not be described.

It will be understood that when a component is referred to as being "connected" to another component, it can be directly or indirectly connected to the other component. When a component is indirectly connected to another component, it may be connected to the other component through a wireless communication network.

It will be understood that the terms "includes," "comprises," "including," and/or "comprising," when used in this specification, specify the presence of a stated component, but do not preclude the presence or addition of one or more other components.

It is to be understood that the singular forms "a," "an," and "the" include plural referents unless the context clearly dictates otherwise.

As used herein, the terms "portion," "unit," "block," "member," and "module" refer to a unit that can perform at least one function or operation. For example, these terms may refer to at least one piece of software stored in a memory or at least one piece of hardware, such as a Field Programmable Gate Array (FPGA) or an Application Specific Integrated Circuit (ASIC), or at least one process that is processed by a processor.

Reference numerals used in operations are provided for convenience of description, without describing the order of the operations, and the operations can be executed in a different order from the stated order unless a specific order is definitely specified in the context.

Hereinafter, embodiments of a vehicle according to an aspect and a method of controlling the vehicle will be described in detail with reference to the accompanying drawings.

Figure 2:
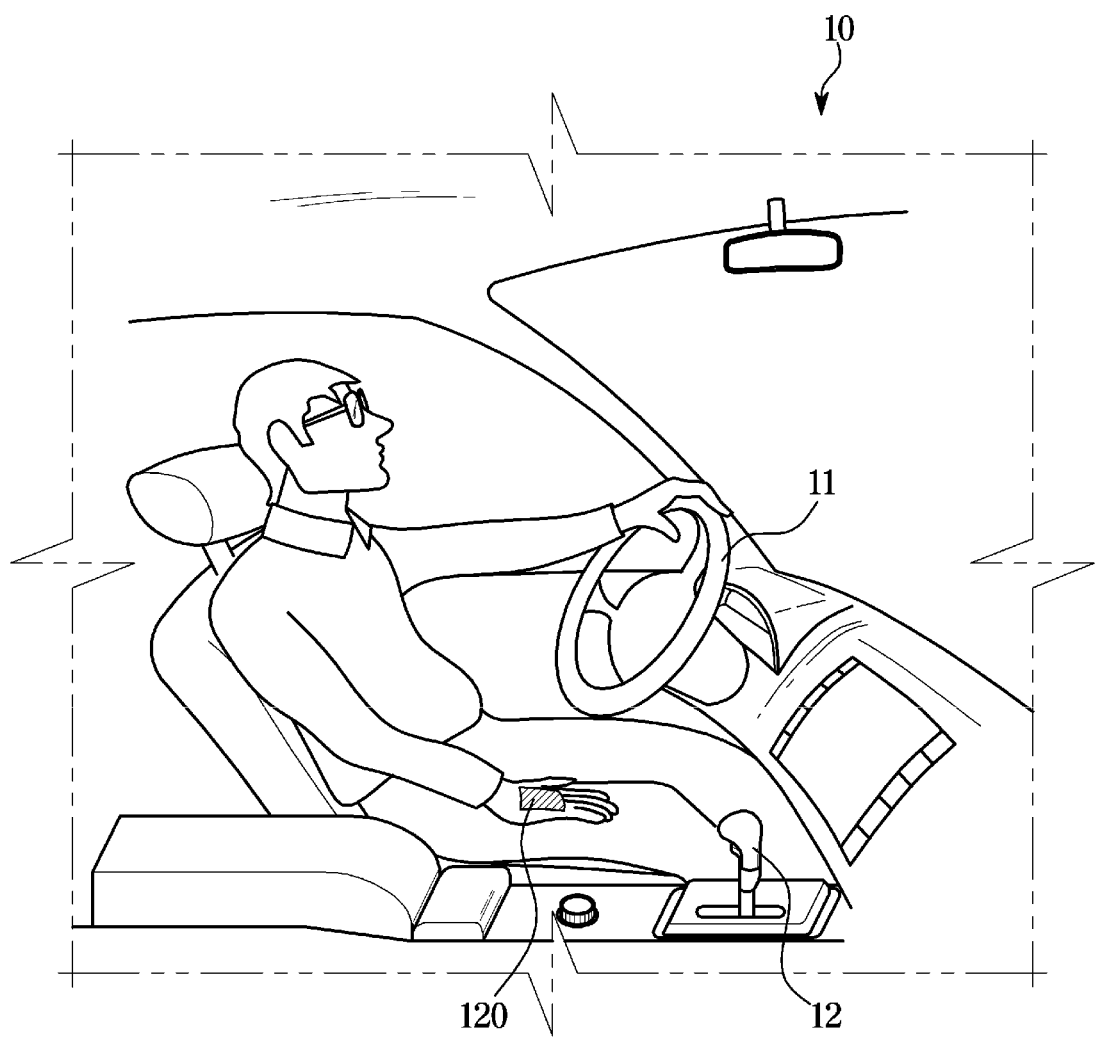
FIG. 2 is a view illustrating an example of a motion recognition sensor according to an exemplary embodiment of the present disclosure.

FIG. 1 is a control block diagram of a vehicle according to an exemplary embodiment of the present disclosure, and FIG. 2 is a view illustrating an example of a motion recognition sensor according to an exemplary embodiment of the present disclosure.

Referring to FIG. 1, a vehicle 10 according to one embodiment includes an input device 110 for receiving an input from a user, a motion recognition sensor 120 for sensing the user's finger motion, a storage 130 for storing information necessary for various controls of the vehicle 10, a controller 140 that determines a finger motion pattern according to the user's finger motion and controls a configuration included in the vehicle 10 according to the finger motion pattern, and an output device 150 that executes the operation of the vehicle 10 under the control of the controller 140.

The input device 110 according to one embodiment can receive various inputs from the user.

Specifically, the input device 110 may receive an input from the user indicating the start or end of control for the output device 150 based on the finger motion, and may receive an input that approves execution of an operation command for any one output device 150 and any one output device 150 determined according to the finger motion.

Further, the input device 110 may receive an input instructing addition of a new finger motion pattern other than the finger motion pattern previously stored from the user.

To this end, the input device 110 may be provided in a center fascia installed at the center of a dashboard, or may be implemented using a physical button, a knob, a touch pad, a touch screen, or a stick type operation device.

At this time, the input device 110 provided with the touch screen may be provided on a display 152-1 of an audio, video, navigation (AVN) device 152 provided inside the vehicle 10.

Further, the input device 110 may include a communication module provided inside the vehicle 10. The communication module can receive the user's remote input that is input to an external terminal device (not shown) such as a remote controller or the like. Thus, the input device 110 may receive a remote input from the user of the vehicle 10 to the external terminal device (not shown).

At this time, the communication module can use a variety of communication protocols (e.g., Bluetooth, NFC, etc.) for communicating with the external terminal device (not shown), and can be used without restriction as long as it is a communication protocol capable of performing communication with the external terminal device (not shown).

Further, the input device 110 may include a microphone provided inside the vehicle 10. Thereby, the input device 110 can receive a voice input from the user of the vehicle 10. At this time, the controller 140 can generate an operation request signal for an operation intended by the user to input the voice by using a natural language understanding algorithm stored in advance.

However, the position and the manner of implementation of the input device 110 are not limited to the above-described example, and may be included without limitation as long as the location and the implementation method of receiving the input of the user.

The motion recognition sensor 120 according to an exemplary embodiment of the present disclosure may sense the user's finger motion and output a signal regarding the finger motion.

Specifically, the motion recognition sensor 120 may correspond to a piezoelectric element that outputs an electrical signal with a different magnitude and phase depending on the pressure, and can output the electrical signal corresponding to the operation of each of a thumb, index finger, middle finger, ring finger, and little finger of the user.

In this way, the controller 140 can compare the previously stored reference value for each of the plurality of fingers with the electrical signal corresponding to the user's finger motion, and determine the operation for each of the plurality of fingers and the operation order among the plurality of fingers.

To this end, the motion recognition sensor 120 may be attached to at least one of the user's hand, palm, wrist or arm so as to sense the user's finger motion, as shown in FIG. 2. In this case, the motion recognition sensor 120 can transmit the electrical signal corresponding to the finger motion to the controller 140 through wired communication or wireless communication. For this, the motion recognition sensor 120 may include a communication module capable of processing a wired/wireless communication protocol.

In addition, the motion recognition sensor 120 may be provided on a steering wheel 11 or a gear bar 12 of the vehicle 10 to sense the movement of the user's finger.

However, the type and location of the motion recognition sensor 120 may vary depending on the embodiment, and may include any sensor and position that can sense the user's finger motion.

The storage 130 according to one embodiment may include various kinds of information necessary for controlling the vehicle 10.

For example, the storage 130 may store a reference value for each of the plurality of fingers for determining the finger motion pattern. Accordingly, the controller 140 can determine the motion for each of the plurality of fingers by comparing the output of the motion recognition sensor 120 with the reference value for each of the plurality of fingers.

Further, the storage 130 may store information on a correlation between the finger motion pattern and the operation of the output device 150. Accordingly, the controller 140 can determine the operation command of the output device 150 and the output device 150 corresponding to the finger motion pattern determined based on the output of the motion recognition sensor 120.

The storage 130 may store information necessary for controlling various configurations of the vehicle 10 in addition to the above examples.

The storage 130 according to one embodiment may correspond to a memory that stores the above-described information and the following information, and may be implemented as at least one of a non-volatile memory device (for example, a cache, Read Only Memory (ROM), Programmable ROM (PROM), Erasable Programmable ROM (EPROM), Electrically Erasable Programmable ROM (EEPROM), and flash memory), a volatile memory device (for example, Random Access Memory (RAM)), or a storage medium (for example, Hard Disk Drive (HDD) and Compact Disc Read Only Memory (CD-ROM)) for storing various information, although not limited to these.

The storage 130 may be a memory implemented as a separate chip or may be implemented as a single chip with a processor corresponding to the controller 140. The controller 140 determines the finger motion pattern based on the signal for the finger motion received from the motion recognition sensor 120, and controls any one of the at least one output device 150 included in the vehicle 10 based on the determined finger motion pattern.

Specifically, the controller 140 according to the embodiment can determine the finger motion pattern based on the signal for the finger motion.

For example, the controller 140 may determine at least one of a motion of each of the plurality of fingers or a sequence of motions between the plurality of fingers by comparing the signal for the finger motion and a reference value for each of the plurality of fingers, and determine the finger motion pattern based on at least one of the motion of each of the plurality of fingers or the sequence of motions between the plurality of fingers.

That is, the controller 140 can determine whether or not the corresponding finger is moved, and can determine the sequence of motions between the fingers by comparing the signals for the motions of the thumb, the index finger, the middle finger, the ring finger, and the little finger with the respective reference values.

As described above, the finger motion pattern may correspond to the operation of each of the thumb, the index finger, the middle finger, the ring finger, and the little finger or the sequence of motions between the fingers.

For example, the finger motion pattern determined by the controller 140 may correspond to "one time motion of the thumb," and another example may correspond to "two times motion of the index finger after one time motion of the thumb."

That is, the finger motion pattern may correspond to a time series arrangement of one or more finger motions.

At this time, according to the embodiment, the reference value for each of the plurality of fingers may be personalized according to the user.

Specifically, the controller 140 according to the embodiment controls the AVN device 152 to output a message that induces an input for at least one finger motion, receives the signal for the finger motion of the user inputted corresponding to the message from the motion recognition sensor 120, and updates at least one of the reference values for each of the plurality of fingers used for determination of the finger motion pattern based on the received signal for the finger motion.

That is, the controller 140 controls the AVN device 152 to visually or auditorily output a message for prompting the user to input a finger-by-finger motion, and can update the control value of the vehicle 10 so that the vehicle 10 can be optimized for the finger motion of the current user by updating the reference value to be compared with the signal for the finger motion so that the finger motion pattern corresponding to the current user's finger motion can be determined based on the signal for the finger motion corresponding to the message.

For example, when the signal for the finger motion of the user is lower than a predetermined reference value, the controller 140 can reduce the predetermined reference value so that the finger motion pattern can be determined even when the finger motion of the user is minute.

In addition, when the signal for the user's finger motion is higher than a predetermined reference value, the controller 140 can increase the predetermined reference value so that the finger motion pattern can be determined even when the user's finger motion is large.

The controller 140 according to the embodiment can control any one of the at least one output device 150 included in the vehicle 10 based on the determined finger motion pattern.

Particularly, the controller 140 may determine any one of the output devices to be controlled among the at least one output device 150 included in the vehicle 10 based on the determined finger motion pattern, and may determine the operation command for any one of the output devices based on the determined finger motion pattern.

At this time, the controller 140 can determine any one of the output devices and the operation commands to be controlled based on the information indicating the correlation between the finger motion pattern stored in advance and the operation of the output device.

For example, the controller 140 can determine any one of the output devices to be controlled among the at least one output device 150 in the vehicle 10 based on a first finger motion pattern among the determined finger motion patterns.

The controller 140 may determine the operation command for a first output device including at least one command for starting, ending, strength, or direction of an output based on a second finger motion pattern determined based on the finger motion of the user after the determination of the first finger motion pattern among the determined finger motion patterns.

In addition, the controller 140 may determine the operation mode for the first output device including a command for a kind of output based on a third finger motion pattern determined based on the finger motion of the user after the determination of the first finger motion pattern and before the determination of the second finger motion pattern among the determined finger motion patterns.

That is, the controller 140 may determine any one of the output devices corresponding to the controlled object corresponding to the determined finger motion pattern, based on the information indicating the correlation between the stored finger motion pattern and the operation of the output device, and may determine the operation command for any one of the determined output devices corresponding to the finger motion pattern according to the finger motion input thereafter.

At this time, the operation command may include at least one command for starting, ending, adjusting the intensity, or directing the output of the output device 150, respectively.

The controller 140 may determine the operation mode of a control target based on the finger motion pattern corresponding to the finger motion input between the selection of a control object and the determination of the operation command of the control object.

At this time, the operating mode may include an instruction for the type of output of the output device 150.

The controller 140 can control any one of the output devices determined based on at least one of the determined operation mode or the determined operation command.

At this time, the controller 140 may receive an approval input from the user as to whether or not to control the output device based on at least one of the operation mode or the operation command, according to the embodiment.

That is, the controller 140 can control any one of the output devices, the operation mode, and the output device corresponding to the operation command determined by the user based on the finger motion pattern.

The controller 140 can control the AVN device 152 to at least one of visually or auditorily output information on at least one of the output device, the operation command, or the operation mode determined based on the finger motion pattern.

The controller 140 may control the determined output device based on the at least one of the operation command or the operation mode, when receiving an input from the at least one of the input device 110 or the motion recognition sensor 120 to approve at least one of the operation command or the operation mode for the determined output device.

Thereby, the vehicle 10 can receive the approval of the user when controlling one of the output devices based on the user's finger motion, so that it is possible to provide the control of the output device more accurately.

The controller 140 according to the embodiment can start or end control of the output device 150 based on the finger motion pattern based on the user's input.

The controller 140 is configured to control the output device of any one of the at least one output device 150 by determining the finger motion pattern based on the signal of the finger motion, when receiving an input from at least one of the input device 110 or the motion recognition sensor 120, the input indicating an initiation of control for the at least one output device 150.

The controller 140 is configured to stop the operation of controlling the output device of any one of the at least one output device 150, when receiving an input from at least one of the input device 110 or the motion recognition sensor 120, the input indicating an end of control for the at least one output device.

The controller 140 according to the embodiment controls the at least one output device 150 based on the new operation instruction corresponding to the new finger motion pattern by adding a new finger motion pattern in addition to the previously stored finger motion pattern.

Particularly, the controller 140 may receive a signal for a new finger motion from the motion recognition sensor 120 when receiving an input for the addition of the new finger motion pattern from at least one of the input device 110 or the motion recognition sensor 120, and may receive an input from the input device 110 for a new operation command for any one of the at least one output device 150.

The controller 140 is configured to update information indicating a pre-stored correlation between the finger motion pattern and the operation of the output device so that the new finger motion pattern for the new finger motion and the new operation command for the any one of the at least one output device correspond to each other.

Thereby, the vehicle 10 can provide the user with the operation of the output device corresponding to the new finger motion, when receiving the input for the new finger motion from a future user.

The controller 140 may include at least one memory storing a program for performing the above-described operations and operations, which will be described below, and at least one processor for executing the stored program. When there are a plurality of the memories and processors, they may be integrated into one chip or provided at physically separated positions. In addition, the controller 140 may be an electronic control unit (ECU).

The output device 150 may comprise at least one of an air conditioner 151, the AVN device 152, a window opening/closing device 153, a lamp control device 154, a wiper control device 155, or a driving assist system (DAS) 156.

The air conditioner 151 according to one embodiment is provided in the vehicle 10 and can blow wind (warm or cool air) into the interior space of the vehicle 10 under the control of the controller 140.

Specifically, the air conditioner 151 may include a compressor, a condenser, an expansion valve, and a heat exchanger, and the compressor, the condenser, the expansion valve, and the heat exchanger may be connected to each other through at least one refrigerant passage. Refrigerant flows through the compressor, the condenser, the expansion valve, and the heat exchanger along the refrigerant passage, and the air conditioner 151 can acquire cool air or warmth according to a state of change of the refrigerant flowing. The obtained cool air or warmth can be provided to the interior space of the vehicle 10 through a fan.

To this end, the air conditioner 151 may include a plurality of air outlets provided in the vehicle 10, a motor for driving the fan that generates wind blown into the interior space of the vehicle 10, a motor for adjusting a wing member provided in a blowing hole to adjust the wind direction of the blowing wind.

The air conditioner 151 can provide, under the control of the controller 140, a cooling mode for supplying cool air to the interior space of the vehicle 10, a heating mode for supplying warm air to the interior space of the vehicle 10, a blowing mode in which air is blown into the interior space of the vehicle 10, and an air cleaning mode that provides air circulation to collect dust and contaminants in the air in the interior space of the vehicle 10.

Further, the air conditioner 151 can start or stop the operation under the control of the controller 140, adjust the temperature of the air to be blown, and adjust the wind direction and wind speed.

The AVN device 152 according to one embodiment includes the display 152-1 and a speaker 152-2 provided in the vehicle 10, and provides, under the control of the controller 140, a radio mode in which the user reproduces a radio signal based on a terrestrial radio signal in the vehicle 10, an audio mode for reproducing sound based on a sound file, a video mode for reproducing an image based on a broadcast signal or an image file, and a navigation mode that guides the user to a destination route In addition, the AVN device 152 may be connected to a user device such as a smartphone, PMP (portable multimedia player), MP3 (mpeg audio layer-3) player, and PDA (personal digital assistant) through WiFi and Bluetooth pairing to reproduce the sound and image files.

The AVN device 152 can start or end an operation under the control of the controller 140, adjust the volume of the sound to be output, can control the channel of the broadcast signal to be output, and can control the start and end of the route guidance.

To this end, the display 152-1 may be provided inside the vehicle 10 and may include a panel. For example, the display 152-1 may be provided in a cluster, and may be provided across the cluster and a center fascia.

The panel may be at least one of a cathode ray tube (CRT) panel, a liquid crystal display (LCD) panel, a light emitting diode (LED) panel, an organic light emitting diode (OLED) panel, a plasma display panel (PDP), or a field emission display (FED) panel.

However, the position and the number of the displays 152-1 may be included in any number and position of the vehicle 10 so that the user of the vehicle 10 can visually transmit the information.

The speaker 152-2 may be provided inside the vehicle 10 and may be provided without limitation as long as it is capable of listening to the sound output by the user of the vehicle 10.

The window opening/closing device 153 according to the embodiment controls the opening and closing of a window provided on a door in the vehicle 10 or the opening and closing of a sunroof provided on the upper side of the vehicle 10 under the control of the controller 140.

The lamp control device 154 according to one embodiment can control the on/off and brightness adjustment of various lamps included in the vehicle 10 under the control of the controller 140.

The wiper control device 155 according to the embodiment controls the on/off of various wipers provided on a front window or a rear window of the vehicle 10 and the control of the operation speed of the wiper according to the control of the controller 140.

The driving assist system 156 assists the driving of the vehicle 10 and can perform a forward collision avoiding mode, a lane departure warning mode, a blind zone monitoring mode, a rearward monitoring mode, and the like, under the control of the controller 140.

To this end, the driving assist system 156 may include a plurality of devices connected through communication. For example, the driving assist system 156 may include FCW (forward collision warning system), AEBS (advanced emergency braking system), ACC (adaptive cruise control), LDWS (lane departure warning system), LKAS (lane keeping assist system), BSD (blind spot detection), RCW (rear-end collision warning system) and the like.

Various configurations included in the vehicle 10 have been described in detail above. Hereinafter, a configuration for determining the finger motion pattern of the user by using the various configurations of the vehicle 10 and controlling the output device 150 based thereon will be described in detail.

Figure 4:
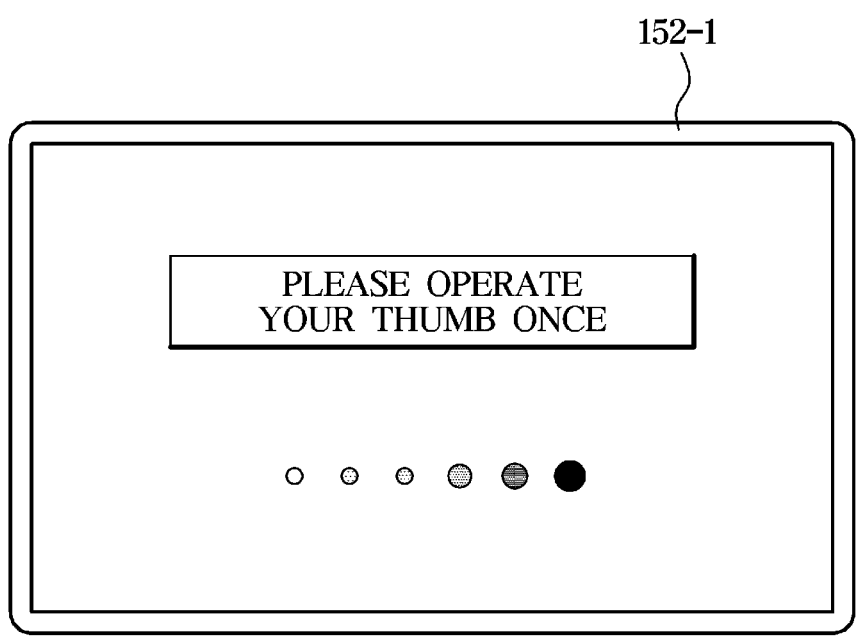
FIG. 4 is a view illustrating a case where a vehicle outputs a guidance message for initial personalization registration according to an exemplary embodiment of the present disclosure.
Figure 5:
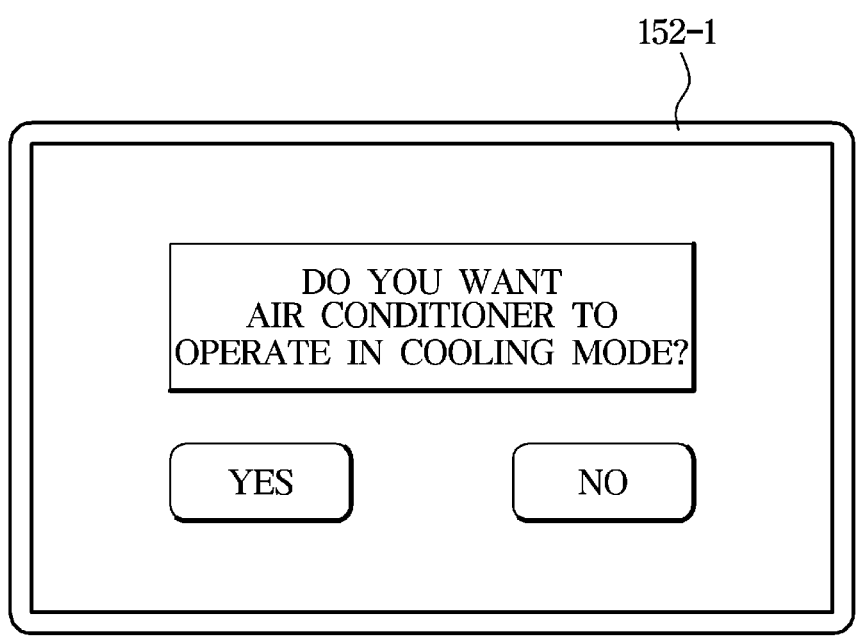
FIG. 5 is a view illustrating a case when a vehicle determines an operation of an output device based on a finger motion pattern according to an exemplary embodiment of the present disclosure.

FIG. 3 is a view illustrating information indicating a correlation between a finger motion pattern and an operation of an output device according to an exemplary embodiment of the present disclosure, FIG. 4 is a view illustrating a case where a vehicle outputs a guidance message for initial personalization registration according to an exemplary embodiment of the present disclosure, and FIG. 5 is a view illustrating a case when a vehicle determines an operation of an output device based on a finger motion pattern according to an exemplary embodiment of the present disclosure.

Referring to FIG. 3, the storage 130 according to one embodiment may store information indicating a correlation between the finger motion pattern and the operation of the output device 150.

At this time, the information indicating the correlation between the finger motion pattern and the operation of the output device 150 may include information on the type of the output device 150 corresponding to the finger motion pattern, may include information on an operation mode of each of the output devices 150 corresponding to the finger motion pattern, and may include information on the operation command of each of the output devices 150 corresponding to the finger motion pattern.

For example, the information indicating the correlation between the finger motion pattern and the operation of the output device 150 may store information indicating that the output device 150 corresponding to the finger motion pattern indicating "two times motion of the index finger" corresponds to the air conditioner 151.

In addition, the information indicating the correlation between the finger motion pattern and the operation of the output device 150 may store information indicating that the operation mode corresponding to the finger motion pattern indicating "one time motion of the index finger after one time motion of the thumb" inputted after the finger motion for selecting the air conditioner 151 corresponds to the heating mode.

In addition, the information indicating the correlation between the finger motion pattern and the operation of the output device 150 may store information indicating that the operation command corresponding to the finger motion pattern indicating the input "two times motion of the middle finger" after the finger motion for mode selection of the air conditioner 151 corresponds to an ON/OFF command.

However, the above example and the example shown in FIG. 3 are only one example, and the information indicating the correlation between the finger motion pattern and the operation of the output device 150 can store information on the finger motion pattern corresponding to the various output devices 150 included in the vehicle 10, may store information about the finger motion pattern corresponding to the mode provided by each of the output devices 150, and may store information on the finger motion pattern corresponding to the operation command that can be assigned to each of the output devices 150.

As described above, the information on the finger motion pattern corresponding to the type of the output device 150, the operation mode of each of the output devices 150, and the operation command of each of the output devices 150 is predetermined and stored in the storage 130.

That is, the information indicating the correlation between the finger motion pattern and the operation of the output device 150 may be predetermined in the design stage of the vehicle 10 and stored in the storage 130 or may be predetermined by the user of the vehicle 10 using at least one of the input device 110 or the motion recognition sensor 120 and stored in the storage 130, according to the embodiment.

The controller 140 according to the embodiment can control the output device 150 based on the information indicating the correlation between the finger motion pattern and the operation of the output device 150.

For this purpose, the controller 140 can first determine the finger motion pattern input by the user based on the signal for the finger motion received from the motion recognition sensor 120.

Specifically, the controller 140 according to the embodiment can determine the finger motion pattern based on the signal for the finger motion.

For example, the controller 140 may determine at least one of a motion of each of the plurality of fingers or a sequence of motions between the plurality of fingers by comparing the signal for the finger motion and a reference value for each of the plurality of fingers, and determine the finger motion pattern based on at least one of the motion of each of the plurality of fingers or the sequence of motions between the plurality of fingers.

That is, the controller 140 can determine whether or not the corresponding finger is moved, and can determine the sequence of motions between the fingers by comparing the signals for the motions of the thumb, the index finger, the middle finger, the ring finger, and the little finger with the respective reference values.

As described above, the finger motion pattern may correspond to the operation of each of the thumb, the index finger, the middle finger, the ring finger, and the little finger or the sequence of motions between the fingers.

For example, the finger motion pattern determined by the controller 140 may correspond to "one time motion of the thumb," and another example may correspond to "two times motion of the index finger after one time motion of the thumb."

That is, the finger motion pattern may correspond to a time series arrangement of one or more finger motions.

At this time, according to the embodiment, the reference value for each of the plurality of fingers may be personalized according to the user.

Specifically, the controller 140 according to the embodiment controls the AVN device 152 to output a message that induces an input for at least one finger motion, receives the signal for the finger motion of the user inputted corresponding to the message from the motion recognition sensor 120, and updates at least one of the reference values for each of the plurality of fingers used for determination of the finger motion pattern based on the received signal for the finger motion.

For example, the controller 140 may output a message to the user, such as "Please operate your thumb once," as shown in FIG. 4, to induce an input for the operation of the thumb.

However, as shown in FIG. 4, the present invention is not limited to the operation of the thumb, and the controller 140 updates the reference value for each of the plurality of fingers by controlling the AVN device 152 to sequentially display, in addition to the thumb, a message for inducing an input of an operation for at least one of the index finger, the middle finger, the ring finger, or the little finger.

In addition, as shown in FIG. 4, the controller 140 may control the display 152-1 to visually output a message, may control the AVN device 152 to output a message, audibly or visually, unlike the one shown in FIG. 4.

That is, the controller 140 controls the AVN device 152 to visually or auditorily output a message for prompting the user to input a finger-by-finger motion, and can update the control value of the vehicle 10 so that the vehicle 10 can be optimized for the finger motion of the current user by updating the reference value to be compared with the signal for the finger motion so that the finger motion pattern corresponding to the current user's finger motion can be determined based on the signal for the finger motion corresponding to the message.

For example, when the signal for the finger motion of the user is lower than a predetermined reference value, the controller 140 can reduce the predetermined reference value so that the finger motion pattern can be determined even when the finger motion of the user is minute.

In addition, when the signal for the user's finger motion is higher than a predetermined reference value, the controller 140 can increase the predetermined reference value so that the finger motion pattern can be determined even when the user's finger motion is large.

The controller 140 according to the embodiment can control any one of the at least one output device 150 included in the vehicle 10 based on the determined finger motion pattern.

Particularly, the controller 140 may determine any one of the output devices to be controlled among the at least one output device 150 included in the vehicle 10 based on the determined finger motion pattern, and may determine the operation command for any one of the output devices based on the determined finger motion pattern.

At this time, the controller 140 can determine any one of the output devices and the operation commands to be controlled based on the information indicating the correlation between the finger motion pattern stored in advance and the operation of the output device.

For example, the controller 140 can determine any one of the output devices to be controlled among the at least one output device 150 in the vehicle 10 based on the first finger motion pattern among the determined finger motion patterns.

That is, as shown in FIG. 3, when the controller 140 determines the finger motion pattern of "two times motion of the index finger," the controller 140 can determine the air conditioner 151 as the output device 150 corresponding to the control object.

In addition to, the controller 140 may determine the operation command for the first output device including at least one command for starting, ending, strength, or direction of an output based on the second finger motion pattern determined based on the finger motion of the user after the determination of the first finger motion pattern among the determined finger motion patterns.

That is, as shown in FIG. 3, when the finger motion pattern corresponding to "two times motion of the middle finger" is determined, the controller 140 can determine that the operation command of the air conditioner 151 is on/off (ON/OFF).

In addition, the controller 140 may determine the operation mode for the first output device including a command for a kind of output based on the third finger motion pattern determined based on the finger motion of the user after the determination of the first finger motion pattern and before the determination of the second finger motion pattern among the determined finger motion patterns.

That is, as shown in FIG. 3, the controller 140 can determine the operation mode of the air conditioner 151 as the cooling mode when the finger motion pattern corresponding to "one time motion of the index finger after one time motion of the thumb" is determined.

That is, the controller 140 may determine any one of the output devices corresponding to the controlled object corresponding to the determined finger motion pattern, based on the information indicating the correlation between the stored finger motion pattern and the operation of the output device, may determine the operation command for any one of the determined output devices corresponding to the finger motion pattern according to the finger motion input thereafter.

At this time, the operation command may include at least one command for starting, ending, adjusting the intensity, or directing the output of the output device 150, respectively.

The controller 140 may determine the operation mode of the control target based on the finger motion pattern corresponding to the finger motion input between the selection of the control object and the determination of the operation command of the control object.

At this time, the operating mode may include an instruction for the type of output of the output device 150.

The controller 140 can control any one of the output devices determined based on at least one of the determined operation mode or the determined operation command.

At this time, the controller 140 may receive an approval input from the user as to whether or not to control the output device based on at least one of the operation mode or the operation command, according to the embodiment.

That is, the controller 140 can control any one of the output devices, the operation mode, and the output device corresponding to the operation command determined by the user based on the finger motion pattern.

The controller 140 can control the AVN device 152 to at least one of visually or auditorily output information on at least one of the output device, the operation command, or the operation mode determined based on the finger motion pattern.

Particularly, the controller 140 can control the AVN device 152 to output information on at least one of the output device, the operation command, or the operation mode determined based on the finger motion pattern by voice, and can control the AVN device 152 to output information on at least one of the output device, the operation command, or the operation mode determined based on the finger motion pattern as a specific signal (e.g., specific sounds, specific images, etc.).

For example, as shown in FIG. 5, the controller 140 may control the display 152-1 to output a message asking for approval for the operation of the air conditioner 151 determined based on the finger motion pattern in the cooling mode.

At this time, the controller 140 may control the determined output device based on the at least one of the operation command or the operation mode, when receiving an input from the at least one of the input device 110 or the motion recognition sensor 120 to approve at least one of the operation command or the operation mode for the determined output device.

For example, when receiving the approval for the operation of the air conditioner 151 in the cooling mode through the input device 110 or receiving the finger motion corresponding to the approval for the operation through the motion recognition sensor 120, the controller 140 can control the air conditioner 151 to operate in the cooling mode.

Thereby, the vehicle 10 can receive the approval of the user when controlling one of the output devices based on the user's finger motion, so that it is possible to provide the control of the output device more accurately.

In addition, the controller 140 according to the embodiment can start or end control of the output device 150 based on the finger motion pattern based on the user's input.

For example, the controller 140 is configured to control the output device of any one of the at least one output device 150 by determining the finger motion pattern based on the signal of the finger motion, when receiving an input from at least one of the input device 110 or the motion recognition sensor 120, the input indicating an initiation of control for the at least one output device 150.

In addition, the controller 140 is configured to stop the operation of controlling the output device of any one of the at least one output device 150, when receiving an input from at least one of the input device 110 or the motion recognition sensor 120, the input indicating an end of control for the at least one output device.

The configuration for determining the user's finger motion pattern using various configurations of the vehicle 10 and controlling the output device 150 based thereon has been described in detail above.

The vehicle 10 allows the user to add a new finger motion pattern so as to more adaptively utilize the control of the output device 150 based on the finger motion pattern. Hereinafter, a configuration for adding a new finger motion pattern not included in the information on the correlation between the finger motion pattern and the output device 150 will be described in detail.

Figure 6:
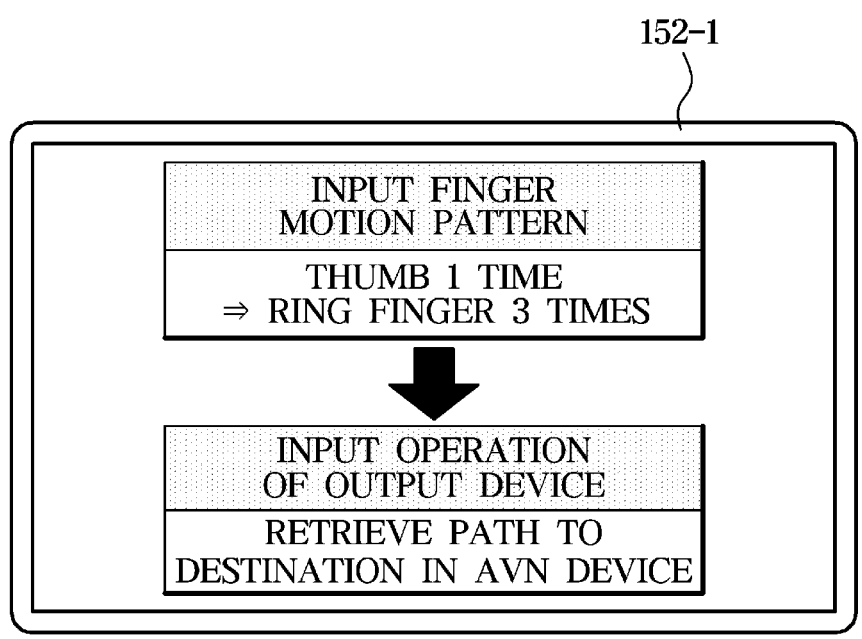
FIG. 6 is a view illustrating a case where a vehicle receives an operation of an output device corresponding to a finger motion pattern from a user according to an exemplary embodiment of the present disclosure.

FIG. 6 is a view illustrating a case where a vehicle receives an operation of an output device corresponding to a finger motion pattern from a user according to an exemplary embodiment of the present disclosure.

Referring to FIG. 6, the controller 140 according to the embodiment controls the at least one output device 150 based on the new operation instruction corresponding to the new finger motion pattern by adding a new finger motion pattern in addition to the previously stored finger motion pattern.

Particularly, the controller 140 may receive a signal for a new finger motion from the motion recognition sensor 120 when receiving an input for addition of a new finger motion pattern from at least one of the input device 110 or the motion recognition sensor 120, and may receive an input from the input device 110 for a new operation command for any one of the at least one output device 150.

For example, as shown in FIG. 6, the controller 140 receives a signal for a new finger operation corresponding to "three times motion of the ring finger after one time motion of the thumb" from the motion recognition sensor 120 and receives an input for a new operation command corresponding to "the route search to the destination of the AVN device 152" from the input device 110.

In addition, the controller 140 may control the display 152-1 to display information on a new finger operation pattern for the new finger operation and a new operation command, for input and confirmation of the user.

At this time, the controller 140 is configured to update the information indicating the pre-stored correlation between the finger motion pattern and the operation of the output device so that the new finger motion pattern for the new finger motion and the new operation command for the any one of the at least one output device correspond to each other.

Thereby, the vehicle 10 can provide the user with the operation of the output device corresponding to the new finger motion, when receiving the input for the new finger motion from the future user.

Hereinafter, a control method of the vehicle 10 will be described. The vehicle 10 according to the above-described embodiment may be applied to the control method of the vehicle 10, as will be described later. Therefore, descriptions given above with reference to FIGS. 1 to 6 may be applied to the control method of the vehicle 10 in the same manner, unless otherwise noted.

Figure 7:
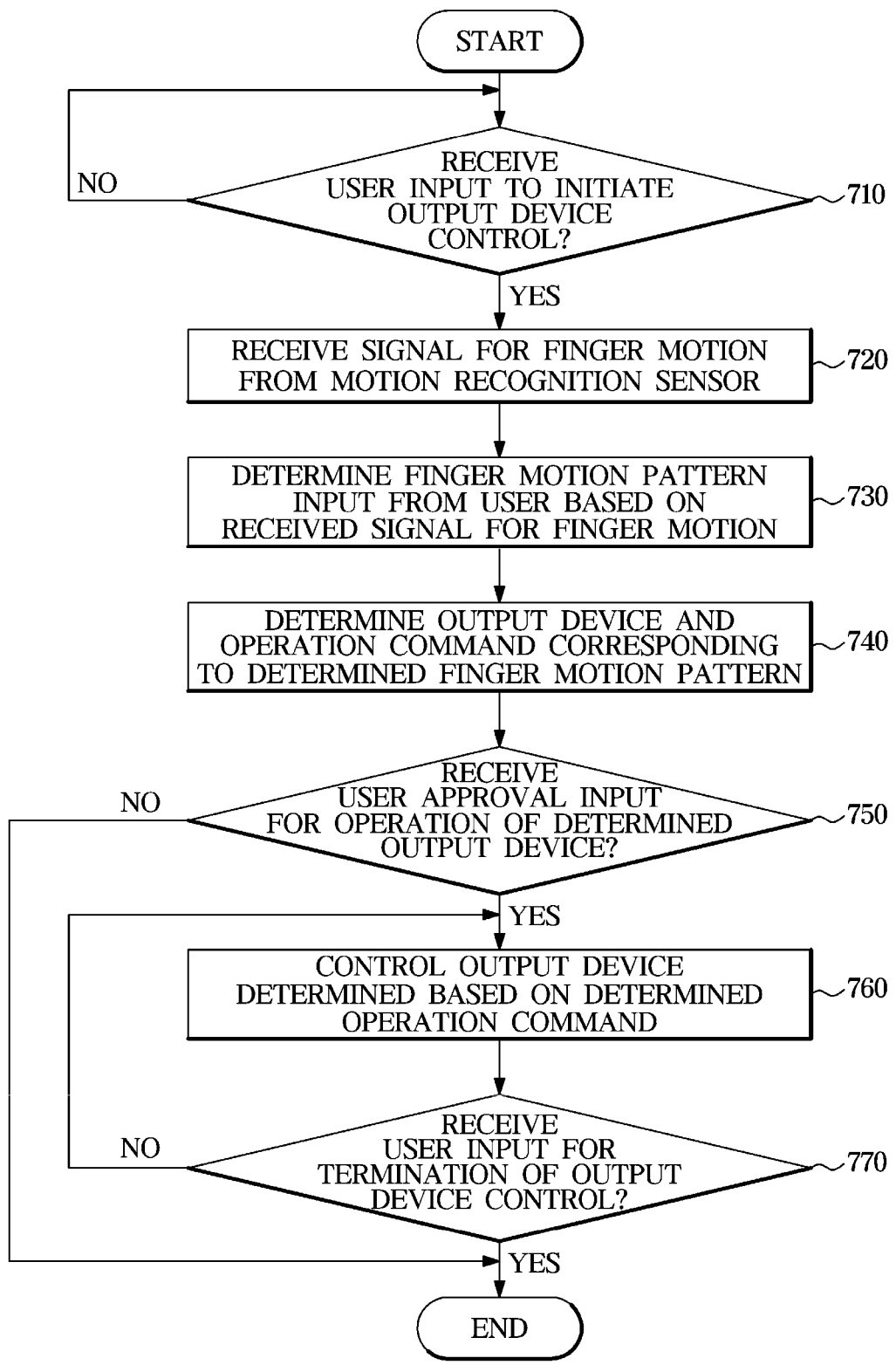
FIG. 7 is a flowchart related to a case where an output device is controlled based on a finger motion pattern in a method of controlling a vehicle according to an exemplary embodiment of the present disclosure.

FIG. 7 is a flowchart related to a case where an output device is controlled based on a finger motion pattern in a method of controlling a vehicle according to an exemplary embodiment of the present disclosure.

Referring to FIG. 7, when the controller 140 according to the embodiment receives the user input for starting the control of the output device 150 (Yes in 710), the controller 140 may receive the signal for the finger operation from the motion recognition sensor 120 (720).

That is, the controller 140 can control the output device of any one of the at least one output device 150 by determining the finger operation pattern based on the signal of the finger operation, when receiving an input from at least one of the input device 110 or the motion recognition sensor 120 for instructing the start of the control for at least one of the output devices 150.

To this end, the controller 140 can determine the finger movement pattern input from the user based on the signal for the received finger motion (730).

Particularly, the controller 140 determines the finger motion pattern based on the signal for the finger motion.

For example, the controller 140 may determine at least one of a motion of each of the plurality of fingers or a sequence of motions between the plurality of fingers by comparing the signal for the finger motion and a reference value for each of the plurality of fingers, and determine the finger motion pattern based on at least one of the motion of each of the plurality of fingers or the sequence of motions between the plurality of fingers.

That is, the controller 140 can determine whether or not the corresponding finger is moved, and can determine the sequence of motions between the fingers by comparing the signals for the motions of the thumb, the index finger, the middle finger, the ring finger, and the little finger with the respective reference values.

As described above, the finger motion pattern may correspond to the operation of each of the thumb, the index finger, the middle finger, the ring finger, and the little finger or the sequence of motions between the fingers. That is, the finger motion pattern may correspond to a time series arrangement of one or more finger motions.

Thereafter, the controller 140 according to an exemplary embodiment of the present disclosure may determine the output device 150 and the operation command corresponding to the determined finger motion pattern (740).

Particularly, the controller 140 may determine any one of the output devices to be controlled among the at least one output device 150 included in the vehicle 10 based on the determined finger motion pattern, and may determine the operation command for any one of the output devices based on the determined finger motion pattern.

At this time, the controller 140 can determine any one of the output devices and the operation commands to be controlled based on the information indicating the correlation between the finger motion pattern stored in advance and the operation of the output device.

For example, the controller 140 can determine any one of the output devices to be controlled among the at least one output device 150 in the vehicle 10 based on the first finger motion pattern among the determined finger motion patterns.

In addition, the controller 140 may determine the operation command for the first output device including at least one command for starting, ending, strength, or direction of an output based on the second finger motion pattern determined based on the finger motion of the user after the determination of the first finger motion pattern among the determined finger motion patterns.

In addition, the controller 140 may determine the operation mode for the first output device including a command for a kind of output based on the third finger motion pattern determined based on the finger motion of the user after the determination of the first finger motion pattern and before the determination of the second finger motion pattern among the determined finger motion patterns.

The controller 140 according to an exemplary embodiment of the present disclosure, when receiving the user approval input for the operation of the determined output device 150 (Yes in 750), may control the output device 150 determined based on the determined operation command (760).

In other words, the controller 140 may receive an approval input from the user as to whether or not to control the output device based on at least one of the operation mode or the operation command, according to the embodiment.

That is, the controller 140 can control any one of the output devices, the operation mode, and the output device corresponding to the operation command determined by the user based on the finger motion pattern.

Particularly, the controller 140 can control the AVN device 152 to at least one of visually or auditorily output information on at least one of the output device, the operation command, or the operation mode determined based on the finger motion pattern.

At this time, the controller 140 may control the determined output device based on the at least one of the operation command or the operation mode, when receiving an input from the at least one of the input device 110 or the motion recognition sensor 120 to approve at least one of the operation command or the operation mode for the determined output device.

However, the controller 140 according to the embodiment may automatically control the output device 150 based on the operation command even when the input from the user is not received.

The controller 140 according to an exemplary embodiment of the present disclosure, when receiving the user input for ending the control of the output device 150 (Yes in 770), may terminate the procedure for controlling the output device 150.

Particularly, the controller 140 is configured to stop the operation of controlling the output device of any one of the at least one output device 150, when receiving an input from at least one of the input device 110 or the motion recognition sensor 120, the input indicating an end of control for the at least one output device.

According to the embodiment, the controller 140 may stop the operation of controlling the output device 150 when the output device 150 performs the operation corresponding to the operation command and the operation is completed.

Figure 8:
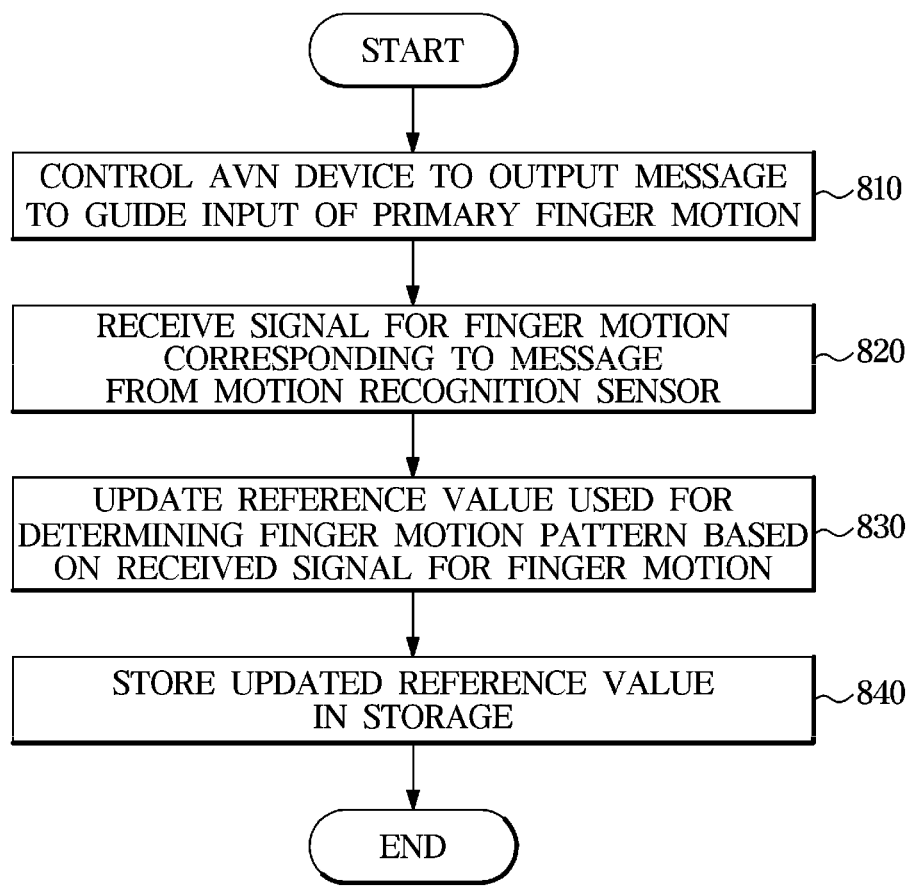
FIG. 8 is a flowchart related to a case where initial personalization registration is executed in a method of controlling a vehicle according to an exemplary embodiment of the present disclosure.

FIG. 8 is a flowchart related to a case where initial personalization registration is executed in a method of controlling a vehicle according to an exemplary embodiment of the present disclosure.

Referring to FIG. 8, the controller 140 according to the embodiment controls the AVN device 152 to output a message that induces an input for at least one finger motion (810).

In addition, the controller 140 according to the embodiment may receive the signal for the finger motion of the user inputted corresponding to the message from the motion recognition sensor 120 (820), and may update at least one reference value for each of the plurality of fingers used for determination of the finger motion pattern based on the received signal for the finger motion (830).

Thereafter, the controller 140 according to the embodiment may store the updated reference value in the storage 130 (840).

That is, the controller 140 can personalize the reference value for each of the plurality of fingers used for determining the finger operation pattern according to the user.

Specifically, the controller 140 according to the embodiment controls the AVN device 152 to output a message that induces an input for at least one finger motion, receives the signal for the finger motion of the user inputted corresponding to the message from the motion recognition sensor 120, and updates at least one reference value for each of the plurality of fingers used for determination of the finger motion pattern based on the received signal for the finger motion.

That is, the controller 140 controls the AVN device 152 to visually or auditorily output a message for prompting the user to input a finger-by-finger motion, and can update the control value of the vehicle 10 so that the vehicle 10 can be optimized for the finger motion of the current user by updating the reference value to be compared with the signal for the finger motion so that the finger motion pattern corresponding to the current user's finger motion can be determined based on the signal for the finger motion corresponding to the message.

For example, when the signal for the finger motion of the user is lower than a predetermined reference value, the controller 140 can reduce the predetermined reference value so that the finger motion pattern can be determined even when the finger motion of the user is minute.

In addition, when the signal for the user's finger motion is higher than a predetermined reference value, the controller 140 can increase the predetermined reference value so that the finger motion pattern can be determined even when the user's finger motion is large.

Figure 9:
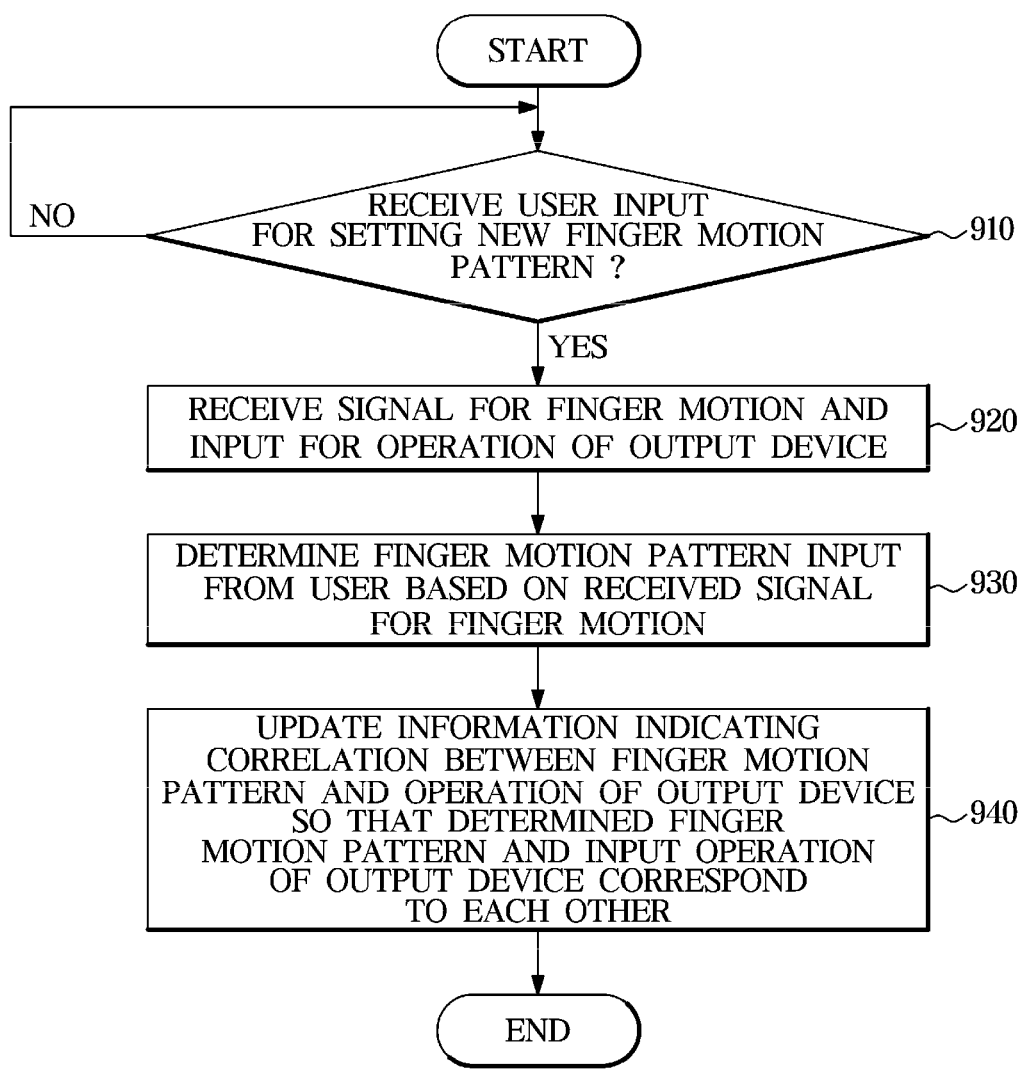
FIG. 9 is a flowchart related to a case of updating information indicating a correlation between a finger motion pattern and an operation of an output device in a method of controlling a vehicle according to an exemplary embodiment of the present disclosure.

FIG. 9 is a flowchart related to a case of updating information indicating a correlation between a finger motion pattern and an operation of an output device in a method of controlling a vehicle according to an exemplary embodiment of the present disclosure.

Referring to FIG. 9, the controller 140 according to an exemplary embodiment of the present disclosure, when receiving the user input for setting a new finger operation pattern (Yes in 910), may receive a signal for a finger operation and an input for an operation of the output device 150 (920).

Particularly, the controller 140 may receive a signal for a new finger motion from the motion recognition sensor 120 when receiving an input for addition of a new finger motion pattern from at least one of the input device 110 or the motion recognition sensor 120.

In this case, the controller 140 according to the embodiment determines the finger operation pattern input from the user based on the signal for the received finger operation (930), and may update the information indicating the pre-stored correlation between the finger motion pattern and the operation of the output device so that the new finger motion pattern for the new finger motion and the new operation command for the any one of the at least one output device correspond to each other (940).

That is, the controller 140 is configured to update the information indicating the correlation between the finger motion pattern and the operation of the output device pre-stored in storage 130 so that the new finger motion pattern for the new finger motion and the new operation command for the any one of the at least one output device correspond to each other.

Thereby, the vehicle 10 can provide the user with the operation of the output device 150 corresponding to the new finger motion, when receiving the input for the new finger motion from the future user.

The disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. A vehicle comprising:
a storage;
at least one output device;
a motion recognition sensor comprising a piezoelectric element which is configured to output an electrical signal corresponding to a finger motion of a user; and
a controller configured to:
determine a sequence of motions between a plurality of fingers by comparing the electrical signal outputted from the piezoelectric element and a reference value corresponding to each of the plurality of fingers for each of users stored in the storage, the sequence of motions including a first finger motion of a first finger and a second finger motion of a second finger after the first finger motion,
determine a first finger motion pattern corresponding to the first finger motion and a second finger motion pattern corresponding to the second finger motion,
determine a first output device among the at least one output device and an operation command based on the first finger motion pattern and the second finger motion pattern,
control the first output device based on the operation command, and
determine an operation mode for the first output device including a command for a type of output based on a third finger's a third finger motion pattern determined based on the finger motion of the user after the determination of the first finger motion pattern and before the determination of the second finger motion pattern.

2. The vehicle according to claim 1, wherein the controller is further configured to:

determine the motion of each of the plurality of fingers by comparing the electrical signal and the reference value; and determine the first finger motion pattern and the second finger motion pattern based on the motion of each of the plurality of fingers.

3. The vehicle according to claim 2, wherein the controller is configured to determine the operation command for the first output device including at least one command for starting, ending, strength, or direction of an output.

4. The vehicle according to claim 2, wherein the vehicle further comprises an input device for receiving an input from the user.

5. The vehicle according to claim 4, wherein the controller is configured to determine the first finger motion pattern and the second finger motion pattern based on an input from at least one of the input device or the motion recognition sensor, the input indicating an initiation of control for the at least one output device.

6. The vehicle according to claim 4, wherein the controller is configured to stop the operation of controlling the first output device, when receiving an input from at least one of the input device or the motion recognition sensor, the input indicating an end of control for the at least one output device.

7. The vehicle according to claim 4, wherein the output device comprises at least one of an air conditioner, an audio, video, navigation (AVN) device, a window opening/closing device, a lamp control device, a wiper control device, or a driving assist system.

8. The vehicle according to claim 7, wherein the controller is configured to control the AVN device to output information on a first output device and the operation command at least one of visually or audibly.

9. The vehicle according to claim 8, wherein the controller is configured to control the first output device based on the operation command, when receiving an input from the at least one of the input device or the motion recognition sensor to approve the operation command for the first output device.

10. The vehicle according to claim 7, wherein the controller is configured to control the AVN device to output a message that induces an input for at least one finger motion.

11. The vehicle according to claim 10, wherein the controller is configured to:
receive the signal for the finger motion of the user inputted corresponding to the message from the motion recognition sensor; and
update at least one reference value for each of the plurality of fingers used for determination of finger motion patterns based on the received signal for the finger motion.

12. The vehicle according to claim 1, wherein the controller is configured to:
receive a signal for a new finger motion from the motion recognition sensor when receiving an input for addition of a new finger motion pattern from at least one of the input device or the motion recognition sensor; and
receive an input from the input device for a new operation command for any one of the at least one output device.

13. The vehicle according to claim 12, wherein the controller is configured to update information indicating a pre-stored correlation between finger motion patterns and the operation of the output device so that the new finger motion pattern for the new finger motion and the new operation command for the any one of the at least one output device correspond to each other.

14. The vehicle according to claim 1, wherein the motion recognition sensor is attached to at least one of the user's hand, palm, wrist or arm, or is provided in at least one of a steering wheel and a gear rod of the vehicle.

15. A method of controlling a vehicle that comprises at least one output device and a motion recognition sensor comprising a piezoelectric element which is configured to output an electrical signal corresponding to a finger motion of a user, the method comprising:
determining a sequence of motions between a plurality of fingers by comparing the electrical signal output from the piezoelectric element and a pre-stored reference value corresponding to each of the plurality of fingers for each of users, the sequence of motions including a first finger motion of a first finger and a second finger motion of a second finger after the first finger motion;
determining a first finger motion pattern corresponding to the first finger motion and a second finger motion pattern corresponding to the second finger motion;
determining a first output device among the at least one output device and an operation command based on the first finger motion pattern and the second finger motion pattern;
controlling the first output device based on the operation command; and
determining an operation mode for the first output device including a command for a kind of output based on a third finger's a third finger motion pattern determined based on the finger motion of the user after the determination of the first finger motion pattern and before the determination of the second finger motion pattern.

16. The method according to claim 15, wherein the determining a finger motion pattern comprises:
determining a motion of each of the plurality of fingers by comparing the electrical signal for the finger motion; and
determining the first finger motion pattern and the second finger motion pattern based on the motion of each of the plurality of fingers.

17. The method according to claim 16, wherein the determining of the operation command comprises determining the operation command for the first output device including at least one command for starting, ending, strength, or direction of an output.

18. The method according to claim 16, wherein the vehicle further comprises an input device for receiving an input from the user.

19. The method according to claim 18, further comprising determining the first finger motion pattern and the second finger motion pattern based on an input from at least one of the input device or the motion recognition sensor, the input indicating an initiation of control for the at least one output device.

20. The method according to claim 18, further comprising stopping the operation of controlling the first output device, when receiving an input from at least one of the input device or the motion recognition sensor, the input indicating an end of control for the at least one output device.

21. The method according to claim 18, wherein the output device comprises at least one of an air conditioner, an audio, video, navigation (AVN) device, a window opening/closing device, a lamp control device, a wiper control device, or a driving assist system.

22. The method according to claim 21, further comprising controlling the AVN device to output information on a first output device and the operation command at least one of visually or audibly.

23. The method according to claim 22, further comprising controlling the first output device based on the operation command, when receiving an input from the at least one of the input device or the motion recognition sensor to approve the operation command for the first output device.

24. The method according to claim 21, further comprising controlling the AVN device to output a message that induces an input for at least one finger motion.

25. The method according to claim 24, further comprising:
receiving the signal for the finger motion of the user inputted corresponding to the message from the motion recognition sensor; and
updating at least one reference value for each of the plurality of fingers used for determination of finger motion patterns based on the received signal for the finger motion.

26. The method according to claim 15, further comprising:
receiving a signal for a new finger motion from the motion recognition sensor when receiving an input for addition of a new finger motion pattern from at least one of the input device or the motion recognition sensor; and
receiving an input from the input device for a new operation command for any one of the at least one output device.

27. The method according to claim 26, further comprising updating information indicating a pre-stored correlation between finger motion patterns and the operation of the output device so that the new finger motion pattern for the new finger motion and the new operation command for the any one of the at least one output device correspond to each other.

28. The method according to claim 15, wherein the motion recognition sensor is attached to at least one of the user's hand, palm, wrist or arm, or is provided in at least one of a steering wheel and a gear rod of the vehicle.

* * * * *